United States Patent Office.

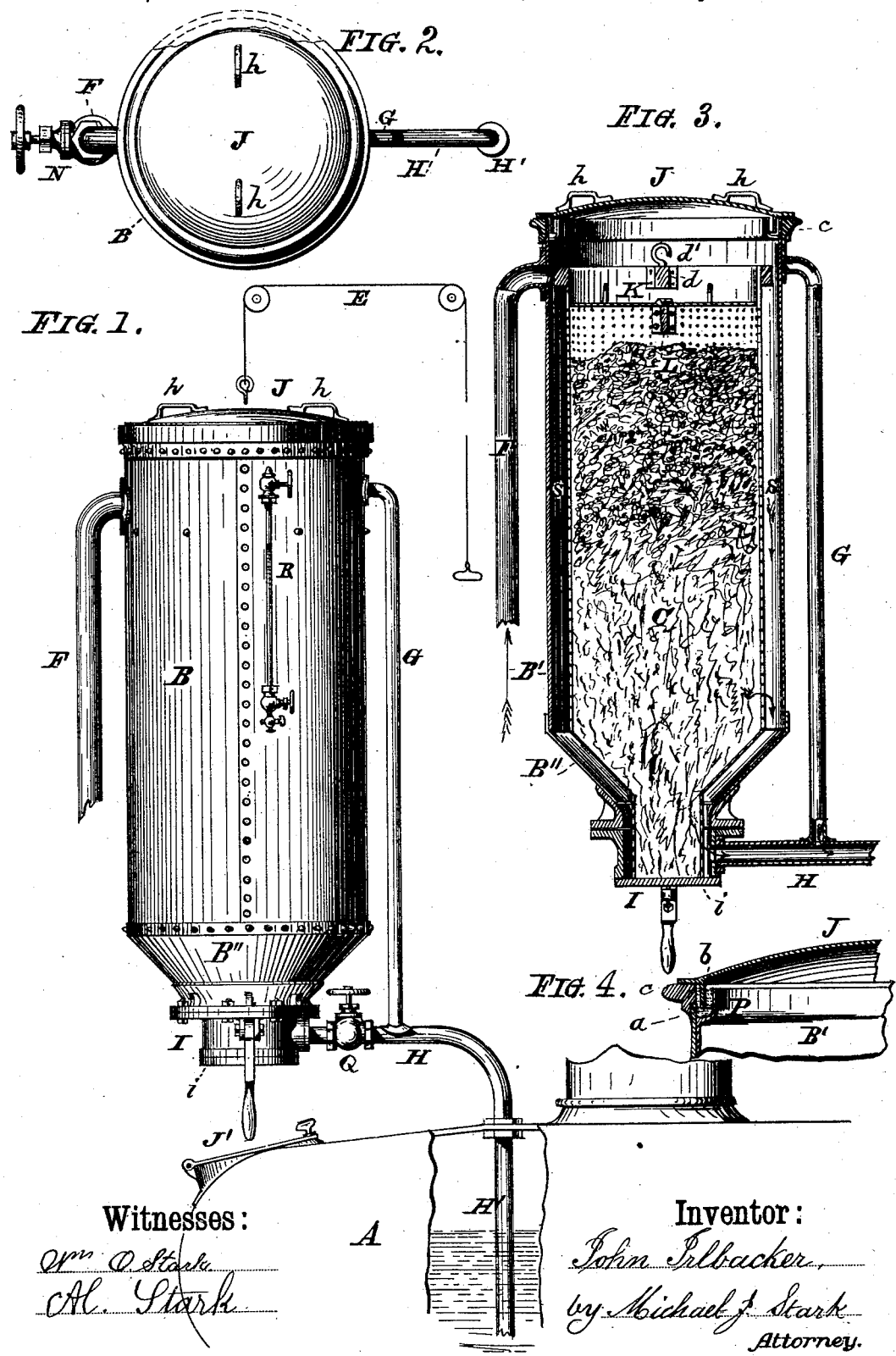

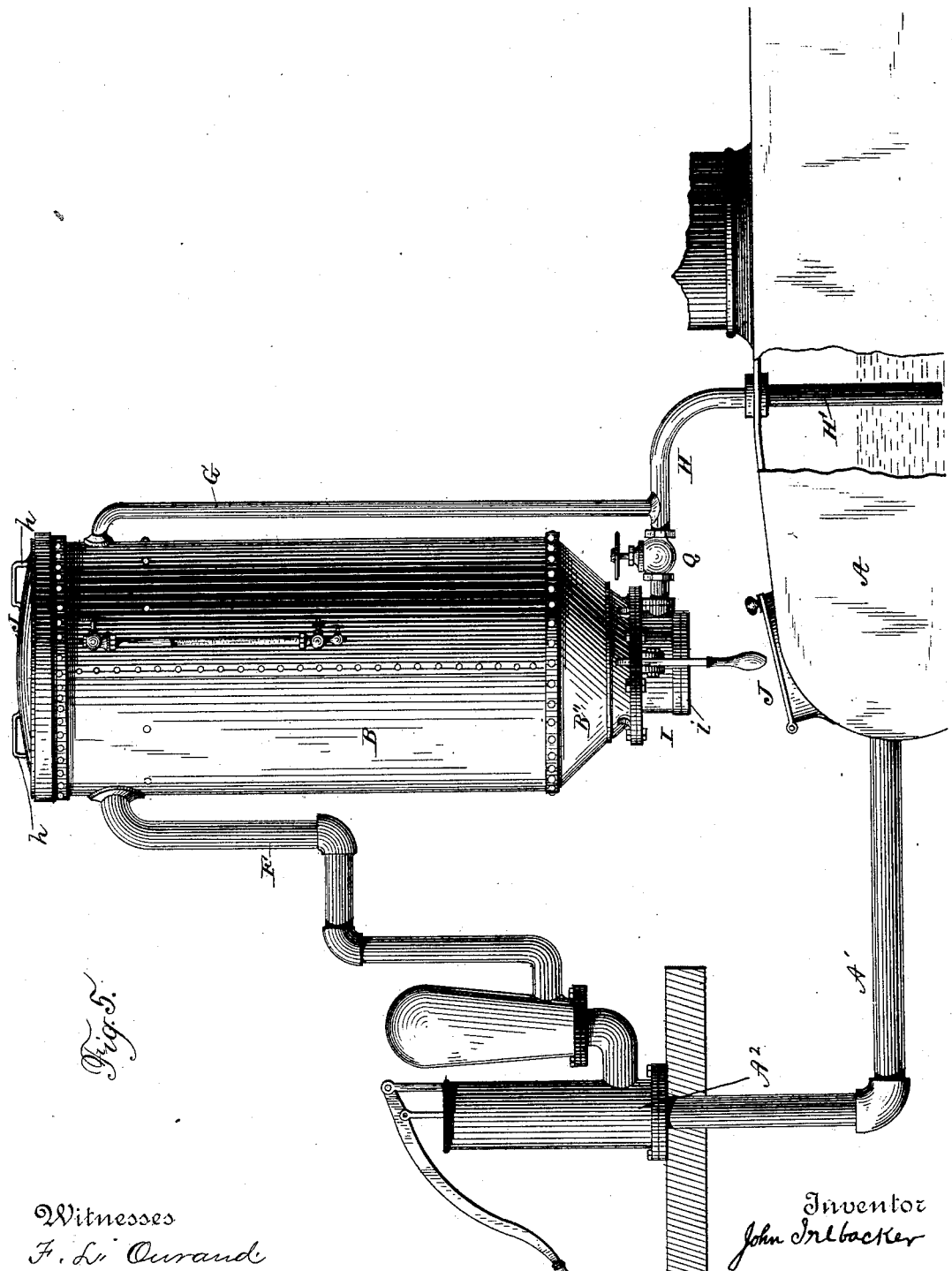

JOHN IRLBACKER, OF BUFFALO, NEW YORK.

APPARATUS FOR BREWING BEER.

SPECIFICATION forming part of Letters Patent No. 362,086, dated May 3, 1887.

Application filed July 21, 1886. Serial No. 208,670. (No model.)

*To all whom it may concern:*

Be it known that I, JOHN IRLBACKER, of Buffalo, in the county of Erie and State of New York, have invented certain new and useful Improvements on an Apparatus for Brewing Beer; and I do hereby declare that the following description of my said invention, taken in connection with the accompanying sheet of drawings, forms a full, clear, and exact specification, which will enable others skilled in the art to which it appertains to make and use the same.

My present invention has general reference to an improved apparatus for boiling the wort for beer; and it consists, essentially, in the novel and peculiar combination of parts and details of construction, as hereinafter first fully set forth and described, and then pointed out in the claims.

In the drawings already mentioned, which serve to illustrate my said invention more fully, Figure 1 is a side elevation of my improved apparatus. Fig. 2 is a plan of the hop-extractor. Fig. 3 is a longitudinal sectional elevation of the same. Fig. 4 is a similar view of the upper portion of the extractor, showing the water-seal for the cover. Fig. 5 is an elevation of the hop-extractor, kettle, pump, and connecting-pipes.

Like parts are designated by corresponding letters of reference in all the figures.

A is the usual beer-kettle, in which the wort during the manufacture of beer is boiled. It does not differ from those now made, except that it may be provided with a man-hole, J', for the purpose hereinafter to be referred to.

B is the hop-extractor. It consists of a cylindrical shell, B', having on its lower end a funnel-shaped extension, B'', which is closed by a so-called "drop-valve," I, such as is shown in Letters Patent No. 311,247, granted to me January 27, 1885, or any other similar means for enabling the discharge of the contents of the interior of the apparatus. The upper end of this shell B' has a band or ring, c, Fig. 4, on its exterior to stiffen the same, and a further ring, P, in its interior to form an annular channel, a, into which a downwardly-projecting rim, b, of the cover J fits.

In the interior of the shell B there is a perforated receptacle, C, removably placed, said receptacle extending downward into the drop-valve I to the bottom thereof. In the upper end of this receptacle C there is a perforated top, K, and above the same a cross-bar, d, having a hook, d', by means of which and a rope and sheaves, E, Fig. 1, or any other convenient device, said interior shell, C, may be removed from the shell B, for the purpose of cleaning, &c.

F is the supply-pipe, which furnishes the interior shell, C, with the liquor for extracting the flavors, aromas, and other solvents from the hops with which it is filled.

G is the vapor-pipe for the volatile products of the said hops, and H the discharge-pipe for the liquor, said pipe entering the kettle A by the pipe H', and extending below the lowest level of the liquor contained in said kettle a sufficient distance to insure the proper dissemination of the liquor and other matters passing through said pipe.

Q is a stop-valve in the pipe H.

A' is a pipe leading from kettle A to a pump, A². A³ is a stop-cock in the pipe A'. By means of the pump and connected parts wort or liquor may be pumped from the kettle A through the pump and thence into the top of the hop-extractor, whereby the liquor may be continuously passed through the hops until the strength is exhausted.

In operation the interior shell, C, in the extractor being filled with hops, the cover J is closed, and the hot wort or beer is pumped through the pipe F into the upper portion of said shell C, where the said liquor will pass through the perforated diaphragm K and thence through the hops and the perforations of the said shell C into the annular space S between the two shells B' C, and finally discharges through the pipe H into the kettle A. If preferred, the hot wort or beer can be drawn also direct from the kettle by the same pump, as heretofore stated, pumped through the pipe F into the upper portion of the shell C, and after undergoing the process is discharged through the pipe H back into the kettle A. In its passage through the hops the hot wort or beer dissolves all soluble salts and matters of the hops, as well as liberates the volatile and aromatic essences and spirits, the latter passing through the pipe G into the pipe H, and, commingling with the liquor, enters the kettle A in such a manner that none of said volatile and other matters can be lost.

By constructing the apparatus as heretofore described, and proceeding with the method of boiling the wort as specified, I produce a product of beer such as has not heretofore been made, and at the same time obtain such product at a saving of twenty per centum at least of the hops used—a result that cannot be equaled by any other method or apparatus.

In operating the apparatus I prefer to place the extractor B directly above the man-hole J' of the kettle A, so that I can drop the contents of the perforated receptacle C' through the said man-hole into the kettle, and there finally boil the hops in the kettle A.

The hops, after having been subjected to the leaching process in the extractor, can either be thrown away or carried to the kettle and boiled for fifteen minutes, more or less, simply for filtering.

In order to prevent the escape of the volatile matters from the upper end of the apparatus without the use of a packing for the cover J, which packing is objectionable, owing to the fact that it will impart an obnoxious flavor to the liquor, I provide the upper end of the shell B' with the water-seal, as described, the liquid of which being continually supplied by the condensation of the vapors on the cover J.

Instead of a continuous passage of beer through the extractor, I may close the valve Q in the pipe H, and then fill the entire extractor full, allowing a sufficient length of time for extraction, after which I discharge the liquor by opening the valve Q, and thus proceed in an intermittent manner until all the soluble and extractable matters have been removed from the hops. Such a method of procedure may produce as good results as a continuous operation; but I prefer the latter for obvious reasons.

R is a glass indicator, to ascertain the height of the liquor in the apparatus.

I am aware that prior to my invention an annular groove provided with water has been employed in connection with an annular flange on a cover for the purpose of producing a water-seal joint. I am also aware that a pump, "boiler, and infusing-vessel," have been combined to circulate wort from one to the other. I am further aware that a perforated funnel-shaped hop receptacle has been employed with an outer casing. I therefore do not claim such constructions, broadly.

The advantages of my invention over prior constructions consist, principally, in providing the inner shell with perforations from top to bottom. This construction permits the liquor to mingle with the hops and readily escape from either the sides or bottom of the perforated shell. Another advantage is in the facility with which the perforated shell may be removed from the outer casing; also, in the drop-valve and arrangement of the kettle, whereby the contents of the hop-extractor may be dumped into said kettle.

Having thus fully described my invention, I claim as new and desire to secure by Letters Patent of the United States—

1. The combination of a hop extractor, a kettle and a pump, a discharge-pipe connecting the extractor with the kettle, a pipe leading from the kettle to the pump, and a pipe leading from the pump to the top of the extractor aforesaid, the under side of the extractor being provided with a drop-valve, the upper side of the kettle being provided with an opening, and the under side of the extractor being immediately above aforesaid opening in the kettle, whereby the contents of the extractor may be dropped into the kettle when desired, substantially as described.

2. The combination of a hop-extractor, consisting of an outer shell having a lower contracted end, a perforated shell located in said outer shell, said perforated shell being also provided with a contracted lower end, the lower ends of said shells being open, a drop-valve on the lower end of the outer shell for closing the lower opening of said shell, and a kettle located immediately under said valve, said kettle being provided with an upper opening and a door for closing the same, the opening in the kettle being immediately under the valve aforesaid, substantially as specified.

3. The combination of a hop-extractor, a kettle and a pump, the lower end of the extractor being immediately above the kettle, a discharge-pipe connecting the extractor with the kettle, a pipe leading from the kettle to the pump, a pipe leading from the pump to the top of the extractor, and a vapor-pipe leading into the top of the extractor and having its lower end in communication with the discharge-pipe aforesaid, substantially as specified.

In testimony that I claim the foregoing as my invention I have hereto set my hand in the presence of two subscribing witnesses.

JOHN IRLBACKER.

Attest:
MICHAEL J. STARK,
JESSIE A. TULLEY.